United States Patent
Boettner et al.

[11] Patent Number: 5,880,465
[45] Date of Patent: Mar. 9, 1999

[54] SCANNING CONFOCAL MICROSCOPE WITH OSCILLATING OBJECTIVE LENS

[75] Inventors: Matthew C. Boettner, St. Paul, Minn.; Steven J. Ouderkirk, West Richland, Wash.

[73] Assignee: Kovex Corporation, Arden Hills, Minn.

[21] Appl. No.: 656,668

[22] Filed: May 31, 1996

[51] Int. Cl.[6] .................................. G02B 7/04; H01J 3/14
[52] U.S. Cl. ........................ 250/234; 250/201.3; 359/383
[58] Field of Search .................... 250/234, 216, 250/201.3, 201.4, 201.5; 359/368, 383

[56] References Cited

U.S. PATENT DOCUMENTS

| | | | |
|---|---|---|---|
| 4,748,322 | 5/1988 | Breitmeier | 250/201 |
| 4,815,058 | 3/1989 | Nakamura et al. | 250/201.5 |
| 4,863,252 | 9/1989 | McCarthy et al. | 350/507 |
| 4,888,476 | 12/1989 | Zucker | 250/201.5 |
| 4,948,984 | 8/1990 | Breitmeier | 250/560 |
| 4,952,816 | 8/1990 | Dunning | 250/560 |
| 5,003,400 | 3/1991 | Murakami et al. | 250/201.1 |
| 5,032,720 | 7/1991 | White | 250/236 |
| 5,035,476 | 7/1991 | Ellis et al. | 350/6.5 |
| 5,084,612 | 1/1992 | Iwasaki et al. | 250/216 |
| 5,097,119 | 3/1992 | Breitmeier | 250/201.4 |
| 5,122,653 | 6/1992 | Ohki | 250/216 |
| 5,126,579 | 6/1992 | Breitmeier | 250/560 |
| 5,144,477 | 9/1992 | White | 359/368 |
| 5,162,941 | 11/1992 | Favro et al. | 359/386 |
| 5,177,512 | 1/1993 | Abe et al. | 351/221 |
| 5,225,923 | 7/1993 | Montagu | 359/199 |
| 5,260,569 | 11/1993 | Kimura | 250/234 |
| 5,283,433 | 2/1994 | Tsien et al. | 250/234 |
| 5,283,684 | 2/1994 | Thomas et al. | 359/234 |
| 5,355,252 | 10/1994 | Haraguchi et al. | 359/369 |
| 5,449,901 | 9/1995 | Fujihira et al. | 250/234 |
| 5,452,125 | 9/1995 | White et al. | 359/368 |
| 5,483,055 | 1/1996 | Thompson et al. | 250/201.3 |
| 5,506,725 | 4/1996 | Koike et al. | 359/388 |
| 5,517,312 | 5/1996 | Finarov | 356/386 |
| 5,532,874 | 7/1996 | Stein | 359/383 |

FOREIGN PATENT DOCUMENTS

| | | | |
|---|---|---|---|
| 0277675 | 8/1988 | European Pat. Off. | |
| 4019405C2 | 6/1990 | Germany | G01B 11/14 |
| 4020527C2 | 6/1990 | Germany | G01B 11/14 |
| 88/02845 | 4/1988 | WIPO | G01B 11/00 |
| 88/02846 | 4/1988 | WIPO | G01B 11/02 |
| WO92/15034 | 9/1992 | WIPO | |

OTHER PUBLICATIONS

Benschop, J., et al., "Confocal compact scanning optical microscope based on compact disc technology", *Applied Optics*, 30, pp. 1179–1184, (Apr. 1991).

Hamilton, D.K., et al., "Scanning optical microscopy by Objective Lens Scanning", *J. Phys. E: Sci. Instrum.*, 19, pp. 52–54, (1986).

Jones, M.G., et al., "Three dimensional imaging through millimeter–thick tissue speimens", *Conference–Three dimensional Microscopy: Image Acquisition and Processing IV*, San Jose, California, (Feb. 12–13, 1997).

Duilio Bertain, et al., entitled "Optical Profilometer", English translation included, pp. 1–23, (Jul. 12, 1979).

*Primary Examiner*—Edward P. Westin
*Assistant Examiner*—Kevin Pyo
*Attorney, Agent, or Firm*—Schwegman, Lundberg, Woessner & Kluth, P.A.

[57] ABSTRACT

A confocal microscope is based on a low mass objective that is driven in one or more axis, with at least one of the axes being driven by a low mass device to provide mechanical scanning of the objective. The scanning mechanism has a low resonance so as to allow the scan length, rate, and range to be easily varied. Control of the objective's position can be either open or closed-loop servoed. The position of the objective can be determined in open-loop systems by calibration, by an internal reference signal coupled with a timing system, or via a means for an absolute or relative determination of the objective's position.

32 Claims, 6 Drawing Sheets

SCANNING CONFOCAL MICROSCOPE WITH OSCILLATING OBJECTIVE LENS

BACKGROUND OF THE ART

1. Field of the Invention

This invention relates to confocal microscopes which detect light reflected or emitted from a sample. This invention also relates to scanning confocal microscopes which provide high quality images at relatively low cost, and which can scan samples in at least one axis using a moving objective lens.

2. Background of the Invention

Confocal microscopes have been known at least in the literature since the 1950's. These microscopes use a visible originating radiation source (although some configurations may now use infrared [IR] or ultraviolet [UV] radiation) which is directed to a beam splitter. The beam splitter directs a portion of the radiation from the source to a collimating lens, which further directs the radiation towards an objective lens. The radiation passing through and focused by the objective lens converges on a focal point. When there is an object at or about the focal point, the focused radiation is reflected back through the objective lens and the collimation lens towards the beam splitter. A further reduced portion of the reflected radiation which has passed a second time through the objective lens and collimating lens passes through the beam splitter and is detected by a detector such as a semiconductor, photovoltaic sensor or large area detector. The radiation emitting source for the originating radiation may be any source which is capable of producing collimated radiation or which may be sufficiently collimated by the collimating lens to provide sufficient coherency to provide resolution to the image, consistency to the quality of the reflection from an object at the focal point and transmission to the detecting devices after the second pass through the beam splitter. Although these devices are of high quality and effectiveness in the marketplace, they are relatively expensive and have significant limitations in their utility which the present inventors have determined is at least in part a result of the weight and size of internal components.

The objective lens in commercial confocal microscopes have traditionally consisted of the higher cost and higher quality quartz lenses, which have significant mass (tending to be at least 20 grams and as much as 50 grams for the lens itself). The lens is moved relative to the target at the focal point by either gross movement of the microscope (with a fixed focal length), movement of the object target (again with a fixed focal length), by movement of the objective lens (changing the focal length), or combinations of these procedures. In those situations where the objective lens is to be moved, the control over the movement, and more importantly the identification of the amount of the movement and its position within the microscope system, is effected by a closed loop system of voltage regulation to coils or piezoelectric devices attached to the objective lens. Changes in the voltage/current to the coils causes them to move in a predetermined direction to shift the position of the objective lens. There are two or more coils (or sets of coils) attached to the objective lens to control movement of the lens in two or more axial directions. The two most important directions are 1) parallel to the incoming radiation from the columnating lens and 2) at least one of the two axes perpendicular to the direction of the radiation from the columnating lens. Direction 2) tends to be fixed (i.e., it is essentially parallel to the surface being scanned and can not readily move within the plane of lines or directions perpendicular to the radiation moving through the columnating lens) and is a single fixed direction often defined as the scanning direction relative to the object or target. The position of the focal point and the objective lens is estimated by the current/voltage provided to the coils. This has been sufficient for the accuracy needed in the confocal microscopes, but is not stable in its realistic accuracy. The response of the coils changes with time, the accuracy of the voltage/current readings change with time, the initial position of the objective lens may shift from impact or vibration, and other physical changes in the system alter the performance and accuracy of the determination of the position of the objective lens and focal point. In many systems, this is not necessarily a problem, as where in profilometers it is the relative variations in the surface which are important and not necessarily the actual position on a surface which is the primary interest of the observer.

In simple terminology, confocal microscopes use a detection method that preferentially measures light that is emitted (e.g., by phosphorescence or fluorescence) or reflected near the focal point of a beam of light. This is typically done by detecting reflected light which is returned through the same objective lens that originally projects a light beam at a target or object and subsequently measuring a portion of the returned light which follows or retraces a portion of the beam path of the illumination source after it has passed through a beam splitter. Microscopic images can be created by scanning either the beam or the sample through two or three axes while measuring signal intensity. Confocal detection offers greatly improved vertical resolution and clarity compared to conventional microscopy. The limitations of confocal microscopy are that the image is acquired by physically moving the focal point over or through a sample, which is generally a slow and often an optically complex process when compared to conventional optical microscopy. Much of the complexity in a confocal microscope is in moving the focal point. Moving the focal point by scanning the light beam can be accomplished either by moving pinholes or by deflecting the beam before the objective lens. Confocal microscopes based on scanned pinholes or aperture are commercially available. These types of confocal microscopes are readily adapted to use much of the optics in a conventional optical microscope. An alternative approach that achieves the same result is to fix the pinhole and scan the beam, illuminating the object or target in an arc, pattern or line form within one plane or two dimensions. Both the scanned beam and the scanned pinhole approaches require expensive objective lenses to provide a wide field of view with near diffraction limited resolution. In many cases, these confocal microscopes also preferably use expensive polarization preserving objective lenses to provide high signal throughput.

Another approach for achieving a scanned focal point in a sample is to scan the object or target co-linearly with the beam of light while the beam and pinhole are fixed in at least one scan axis. The other axes of motion are provided by either moving the sample, or the optical assembly, or both. This type of approach is exemplified in U.S. Pat. Nos. 5,179,276 and 4,863,252. All degrees of motion can also be provided through either the optical assembly, the sample, or a combination of the two. The latter two approaches have limited utility due to the mechanics of rapidly and accurately moving the samples and optical assemblies to provide two or three dimensional images. Resonant scanning of the objective can be used in some devices, although resonant systems are usually at a fixed frequency and are limited in their ability to pan over large sample areas.

The above approaches to confocal microscopy are typified as being inherently bulky and complex.

Italian Patent No. 1203297, published on Feb. 16, 1989 describes a profilometer for measuring the profile of a surface using a confocal distribution of optical assemblies (e.g., radiation source 3, collecting lens 8, beam splitter 5, spatial filter 9, and photoconverter 6). The position detector 14 for determining the instantaneous position of the lens 4 merely indicates electrical signals sent to a piezoelectric device 25a and 25b to oscillate the lens 4. The signal may be indicated by a potentiometer 27 with an indicator needle 27a. There is no collimating lens before the beam splitter, the lens oscillates to create movement of the focal point, single direction variation of the lens is provided (FIG. 2, device 12 for moving lens 4 parallel to its optical axis.

Keyence Corporation of America, 50 Tice Blvd., Woodcliff Lake, N.J. 07675 markets a displacement metering device LT-8110 laser displacement meter noteworthy for its long working distance in the operation of its focal point. The device has a light emitter, beam splitter, objective lens and finishing optical unit (in that sequence in the operation of the microscope). Light reflected off the target passes back through the finishing optics and the objective lens, to be broken into two paths by the beam splitter. One path continues essentially linearly to a light detection unit (e.g., photodetector) and the other path is deflected to another sensing unit whose operation is not understood. The working distance for the focal point is between about 10 and 28 mm, which would be quite large for a confocal microscope. This large working distance appears to be possible because of a relatively large focal length for the objective lens as compared to the diameter of the objective lens. This means that the effective F-number of the system is large (e.g., about 2). Lens systems with large F-numbers have larger spot sizes (when focusing emitted radiation) and larger depths of field. Larger spot sizes tend to decrease the resolving power of the system, which is consistent with the Keyence device advertised as providing about a 2 micron diameter laser beam (effectively defining the resolution of the system as comparable to about 2 microns). The Keyence microscope also is shown in the literature to have the objective move in only a single axis (the axis parallel to the laser beam). It is possible that the lens is moved in an arc, but this is still single direction control, without the capability of independent movement along at least two axes. The finishing optical unit appears to enhance the large working distance in this microscope by adjusting the angle of the radiation after it has passed through the objective lens.

BRIEF DESCRIPTION OF THE INVENTION

The present invention describes a confocal microscope having a radiation source, beam splitter, converging lens, objective lens, and radiation detector capable of recognizing radiation which is reflected or emitted from an object at the focal point of the objective lens, the confocal microscope having means therein to controllably move the objective lens and the focal point of the objective lens through a surface area of at least 0.35 mm$^2$ or a volume of at least 0.25 mm$^3$. This area or volumetric scanning of the focal point is effected by having at least one or two means for moving the objective lens, a first means of said at least two means able to move the objective lens along a first axis, and a second means of said at least two means capable of moving the objective lens along a second axis which is not parallel to said first axis (this second axis is preferably perpendicular or orthogonal to said first axis). The position of the lens is also preferably identified by a physical sensing means which identifies the actual position of the objective lens rather than merely measures current/voltage applied to moving means attached to the objective lens.

DETAILED DESCRIPTION OF THE INVENTION

Figure 1:
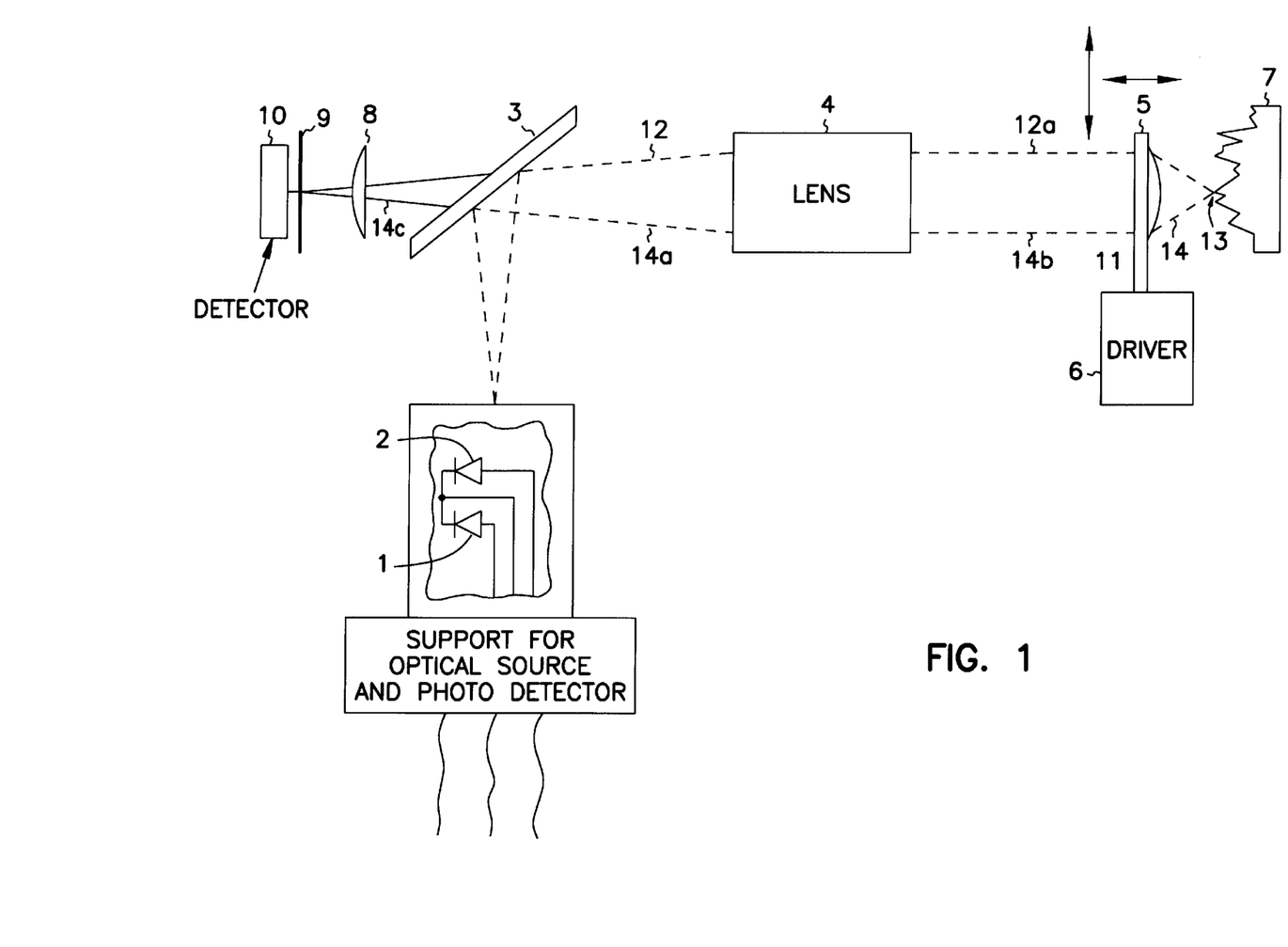
FIG. 1 shows a typical optical configuration used in the invention.
Figure 2:
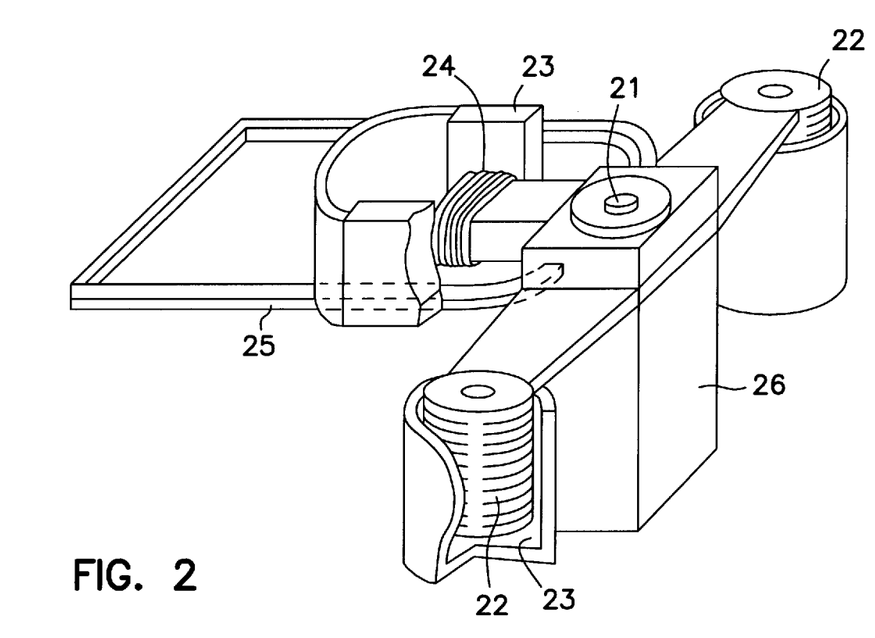
FIG. 2 shows an electromagnetic scanning assembly for the microscope objective

The present invention describes a compact confocal microscope utilizing a low mass objective lens (and therefore capable of using a low mass drive system for the objective lens) which is driven by a high speed drive characterized by low mechanical resonance which drive can move the lens in at least one and preferably two dimensional space (preferably independently along two distinct axes, more preferably where the at least two axes are each orthogonal to each other) so that the focal point of the lens can sweep or determine a plane or a volume by its movement. By low mass objective lens is meant a lens having a weight of less than 2.0 grams, preferably less than 1.5 grams, more preferably a mass of less than 1.0 grams, and most preferably a mass between 0.05 and 0.8 grams, most preferably less than 0.3 grams. The actual weight of the objective in the present preferred construction is 0.13 grams. The present microscope can be compact, lightweight, have good spatial resolution, have low power needs, and have a simple optical design. The weight of the preferred drive source (including coils, flexible support material, plastic frame and the objective was 1.9227 grams. A preferred weight range for an entire drive source would be from about 1 to about 5 grams. The basic configuration of the components, 1–10, of the microscope (not shown) is shown in FIG. 1. Light 11 is provided by a source such as a laser diode 1, with the optical power being regulated by a feedback system driven by photodetector 2. A portion 12 of the radiation output 11 of the optical source 1 is reflected by the beam splitter 3 and is collimated by lens 4. The continued movement of that portion 12 of light 12a is focused by a low resonance, low mass movable objective lens 5 which may be supported by flexible material (not shown). The objective lens 5 is translated by a driver 6. When a portion of the sample 7 (target or object) is within the focal point 13 of the objective lens 5, light 14 returns to the beam splitter 3 along path 14, 14a, 14b. A fraction 14c of the incident returned light 14 illuminating the beam splitter 3 passes through to lens 8 and is focused onto a pinhole aperture 9. The amount or intensity of light detected by detector 10 is related to the distance from the focal point 13 to a reflecting or emitting portion of the sample 7 in line with the beam axis (not shown). FIG. 2 illustrates a low resonance movable objective lens 21 supported by a flexible material 25, driven in two axes of motion by a set of electromagnetic voice coils 22 and 24 interacting with permanent magnets 23 on the fixed portion of the optical assembly. FIG. 2 shows a system capable of moving the focal point in a direction co-linear with the beam path, and in one direction perpendicular to the beam 12a. Alternatively, the objective can be driven in one, two, or three axes by low resonance scanning systems, with the motion of other axes being provided by high resonance or low resonance drives translating either the objective-scanner assembly, the sample, or both.

The confocal microscope of the present invention can be characterized by its ability to provide unique attributes to the optical capacity of the system. The microscope can be provided with a short working length (e.g., between 0.1 and 5 mm, preferably between 0.1 and 2 mm) while providing high resolution of less than 1 micrometer spot size, preferably less than 0.75 micrometers and most preferably less than 0.5 micrometers spot size (resolution). The microscope of the invention can be provided with the ability to move the objective lens independently along at least two distinct axes, with independent movement along at least two orthogonal axes.

The resonance of the objective lens and drive system is defined by a mechanical quality factor 'Q'. Q is defined as the number of oscillations required for the amplitude of the objective lens (in one axis) to drop to 1/e of the maximum amplitude of the oscillation after the drive signal is removed. In this system, 'Q' is measured by producing a steady state oscillation using an appropriate drive signal. The amplitude of the scan is measured, then the drive signal is removed. The Q is the number of oscillations required for the amplitude of the scan to be reduced to 1/e of the scan length when driven. The resonance Q of at least one axis of the scan should be less than 10, preferably less than 5, and most preferably less than 2. For further example, assume that a sine wave provided by a function generator is used as the drive signal for one voice coil that is providing motion of the objective lens in one axis. The sine wave is a 2 Hz wave having a peak-to-peak amplitude of 1.8 volts. The resultant amplitude in the oscillation of the objective lens is 1.5 mm peak-to-peak. When the drive signal is removed, the oscillation drops to 0.552 mm in less than 1 oscillation. In this case, the Q of the system (0.552/1.5) is less than 1.

As noted above, the f-number for the Keyence system appears to be about 2. The f-number is well understood in the art to be defined as the focal length of the lens divided by the clear aperture diameter. The spot size and the depth of field of the focal point are closely related to the f-number of the objective lens. The larger the f-number, the larger the spot size and the depth of field. A large spot size would be undesirable for a microscope, reducing resolution. The Keyence displacement device described above is designed to have a large working distance. To provide this feature, a large f-number objective lens is required which sacrifices resolution in favor of an increased spot size. It appears, although it can not be authoritatively stated without disassembly of the Keyence confocal microscope, that the objective lens is no greater than 5 mm and the objective lens has an f-number of no less than 2. In the present invention, the f-number of the system is preferably less than 1.5, more preferably less than 1.25 and still more preferably less than 1.0. The f-number of the actual working model of the confocal microscope of the present invention is 0.936. A benefit of the present construction is to have the maximum resolution possible within a scannable volume of about 3.5 cubic millimeters and therefore the relatively large f-number is unacceptable for that system.

A surface can be profiled in two or three dimensions by either sampling the fall area of a rectangular slice or a full volume. Alternatively, the low mechanical resonance design of the microscope allows an objective lens to operate with a reduced amplitude of oscillation and a higher oscillation rate. The oscillation which occurs in the practice of the present invention is the movement of the focal point (by way of movement of the means for moving the objective lens and the resulting movement of the objective lens) within the boundaries of its ability to move. The oscillation does not have to be between the absolute extremes of the limits of movement of these elements (the moving means, the objective lens and the focal point), although the oscillation may include either or both extreme ends of the movement range. The movement may be narrowly within the limits of the range of movement based on estimates or actual measurements (taken in real time on the fly during operation of the microscope) of the variations in the surface of the target or object being examined. In this manner, the time required to scan a surface can be reduced by scanning a specific area or volume containing a region of interest. The oscillation of the focal point can be approximately centered on the surface of the sample by applying an offset current to the driver, providing an oscillation force to the objective lens, or by providing a translation in the axis of the oscillation of the focal point by either moving the objective assembly or the sample. The proper value of the offset current or translation of the sample or objective assembly can be determined from the difference between a determination of the position of the surface of the sample by photodetector 10 during oscillation of the objective lens and the position that represents the center of the scan. The proper value of the offset current can also be determined by a lower resolution mapping of the profile of the surface, computing a predicted proper value of the offset current for a number of positions over the scan area of interest, and providing the offset current to the driver. A low resolution map of the surface can be generated by fixing the objective lens at a fixed position in the focus axis while rapidly raster scanning the surface of a sample and determining positions where the sample's surface is in focus. By sequentially moving the objective lens to a new position and scanning the surface again (and repeatedly over the range of movement of the objective lens or until surface values have been determined for the entire surface), a contour surface can be generated. The predicted surface can be used in subsequent high resolution scans by using interpolation of the contour surface to calculate the proper offset current for the oscillating objective lens. In cases where the prediction is incorrect or not within the desired tolerances for the generated data and the focus is not detected within the scan length, the oscillation amplitude can be increased as required, and, if necessary, the area of interest can be rescanned.

The scanning of the objective lens does not have to be in orthogonal axes. For example, the objective lens may be mounted such that the lens oscillates in an arc. This may be the preferred mode since this motion can be easily provided with mountings possessing a low mechanical hysteresis.

The position of the focal point when an in-focus signal is provided by photodetector 10 can be determined by the relationship in timing between the driver current or voltage being provided to the driver and the in-focus signal. The mathematical relationship between the driver current or voltage, the in-focus signal, and the calculated value for the position of the focal point can be obtained by simple prediction or by previous calibration and the use of a look-up table. The accuracy of the calculation of the position of the focal point can be further improved by a reference signal provided by the scan of the focal point. For example, the position of a window interposed between the microscope objective lens and the sample can provide a set of in-focus reference signals for every oscillation of the objective lens, and the time between the reference signal and the infocus signal from the sample can be used to calculate the position of the sample from the reference window. The reference signal is not required for every oscillation of the objective, for example, the window can be used to provide calibration data for the relationship between the phase of the drive current and the oscillation of the objective lens only on a periodic basis.

Other means than pinhole detection for determining the positional relationship between the focal point of the objective lens and a surface may be used. For example, means for determining focus commonly used in compact-disk players may be utilized. In this case, the signal detected by the focus sensing photodiodes will be substantially more complex than with a pinhole detector. In spite of this complexity, the focus positions may be determined by analyzing the rate of change in the detected signal. A common system for determining the focus position in compact disks is an astigmatic lens imaging the light reflected by the surface of the sample onto a quadrilateral photodetector. An in-focus condition is indicated by a peak in the first derivative in the difference of photodetectors (A+B)−(C+D), where A:B and C:D detector pairs are each diagonals on the quadrilateral photodetector. The focusing methods used in compact disk players allows the surface to be identified during the scanning of the objective lens. The use of a quadrilateral focus detector also allows a surface to be followed during a lateral scan, where the position of the objective lens is maintained at a constant distance from the surface during the scan. In this case, the output of (A+B)−(C+D) will be used to provide error information to continuously correct the position of the objective lens. The absolute position of the lens can be recorded during a one or two axes lateral scan, allowing the profile of the surface of the sample to be generated from the measured or calculated position of the objective lens determined in an array of lateral positions during the scan. There are also limitations to the use of the quadrilateral detection schemes. A rapidly changing topography in the surface can be difficult to track with that system. Certain types of surface geometry can cause false positive signal detection because of light reaching the detector which is not at the focal point of the objective lens. The quadrilateral detection system also tends to be more susceptible to optical noise and stray light than a pinhole detection system. This is a result of exposure of the quadrilateral detector to an unisolated optical environment. Additionally, the quadrilateral detector systems which may be modified for use in the present system do not create an image and are not used for resolving an image or even measurably detecting changes in a surface. The quadrilateral detection systems maintain focus of a beam at a specific distance onto a surface for purpose of reading programmed information off that surface. The quadrilateral detector is not reading the beam itself for information, but merely reading the quadrilateral spread of the beam to maintain a specific distance relationship between elements in the compact disk system.

The position of the objective lens has to date been determined by prior calibration between the drive current and the lens position, via the timing methods discussed above, or may be much more accurately and consistently measured by absolute measurement of the lens position. Methods for determining the absolute position of the objective lens includes capacitive detectors, direct or indirect light sources mounted on the objective lens and illuminating a one or two axis position sensing diode, or an optical interferometric system. Methods for indirectly illuminating a position sensing diode includes attaching a pinhole or small mirror directly onto the objective lens' mounting. The pinhole or mirror is illuminated with a fixed source of light such that the illumination is provided over the entire scan dimension or dimensions. Light selected by the mirror or pinhole will may illuminate a position sensing photodiode, which in turn, provides a signal proportional to the displacement of the beam in one or two axes. This displacement will correspond to changes in the position of the objective lens. Acquisition of the signal from the position sensing diode may be simplified by pulsing the illuminating light when a measurement is required. This may simplify the timing of the sample-and-hold circuits used for digitization of the signals. Using pulsed lights will also result in a generally higher potential signal-to-noise ratio in the signal detection for the same average power light source.

Interferometric measurement systems may be independent of or coupled with some of the optics in the confocal microscope, using for example, the same laser diode and beam splitter as the microscope. In the coupled application, a surface portion (near or at, and attached to or part) of the objective lens illuminated by the laser diode will reflect the light such that the reflected light will interfere with light provided by a reference mirror. The modulated light emitted by the beam splitter can be detected by a photodetector and used to determine the absolute position of the objective lens during a scan.

The preferred driver of the objective is an electromagnetic voice coil. Voice coils can provide a driver with low mass for the portion of the driver rigidly connected to the objective lens. The drive current for the voice coil can range from a simple sine or square wave to a waveform optimized so that the scanned objective lens is at a constant velocity for a maximum fraction of the total scan time. An example of such an optimized waveform is pulsed current applied to the driver to reverse the scan direction and little or no current applied to the coil during the portion of the scan wherein measurement occurs. Other drivers such as piezoelectric or electrorestrictive elements are also suitable for this invention.

The mass of the objective lens and the portion of the mechanical driver rigidly attached to the objective lens should be of low mass. Preferably, the combined mass of these two portions should be under 5 grams for an acceptable combination of drive power and total mass of the microscope. Most preferably, the mass of the objective lens and attached driver will have a mass of under 3 grams.

Figure 3A:
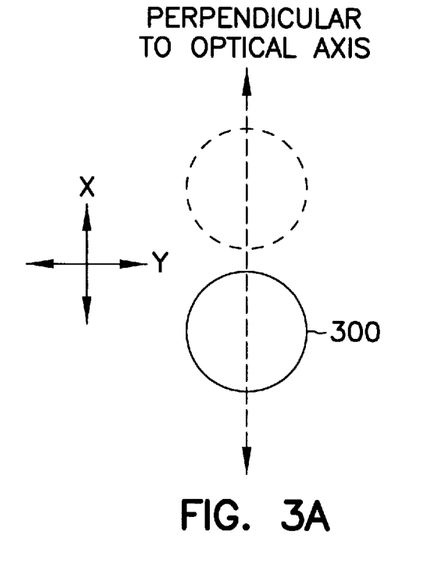
FIGS. 3A, 3B, 3C and 3D show movement of the objective lens in linear movements (FIGS. 3A and 3B) and arcuate movement (3C and 3D).
Figure 3B:
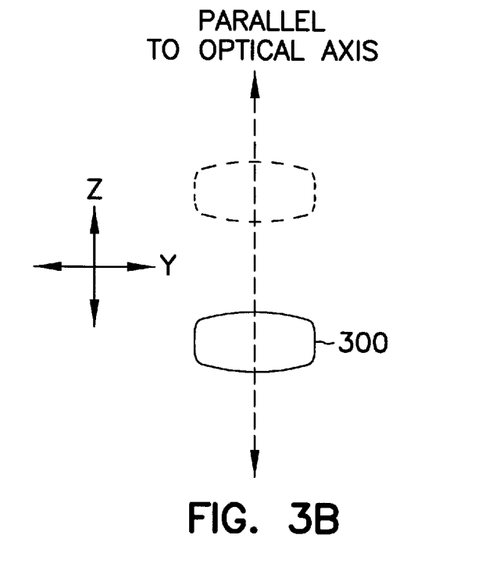
Figure 3C:
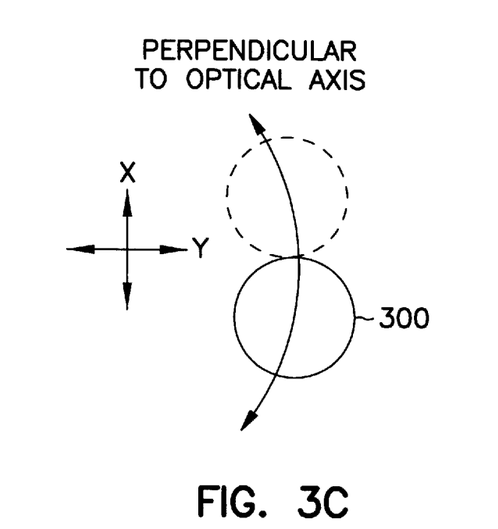
Figure 3D:
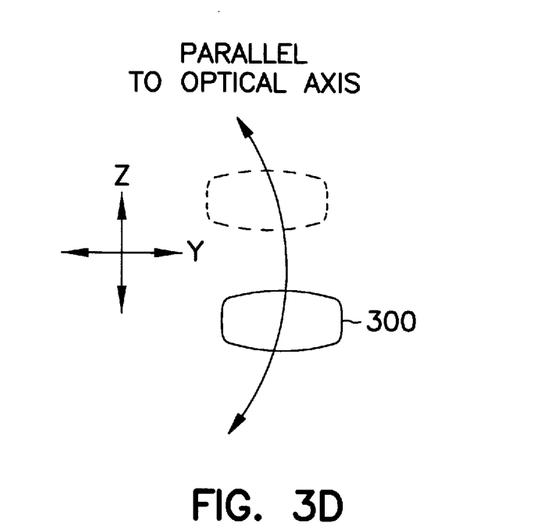

FIGS. 3A, 3B, 3C and 3D show movement of the objective lens 300 in linear movements (FIGS. 3A and 3B) and arcuate movement (3C and 3D). FIG. 3A shows linear lens 300 motion in two directions, perpendicular to the optical axis. FIG. 3B shows linear lens 300 motion in two directions, parallel to the optical axis. FIG. 3C shows arc lens 300 motion in two directions perpendicular to the optical axis. FIG. 3D shows arc lens 300 motion in two directions parallel to the optical axis.

Figure 4A:
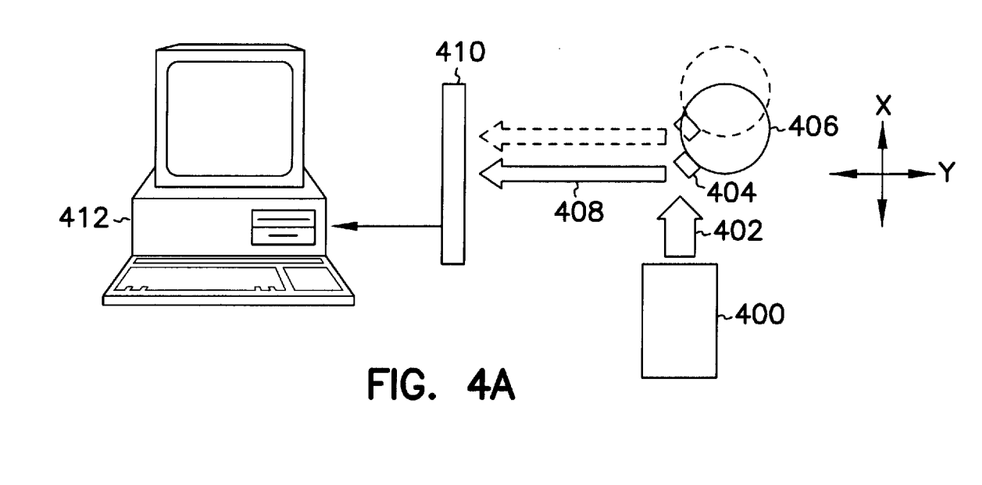
FIGS. 4A and 4B show a flow diagram of information from detectors being sent to a computer with a reflector on the objective lens.
Figure 4B:
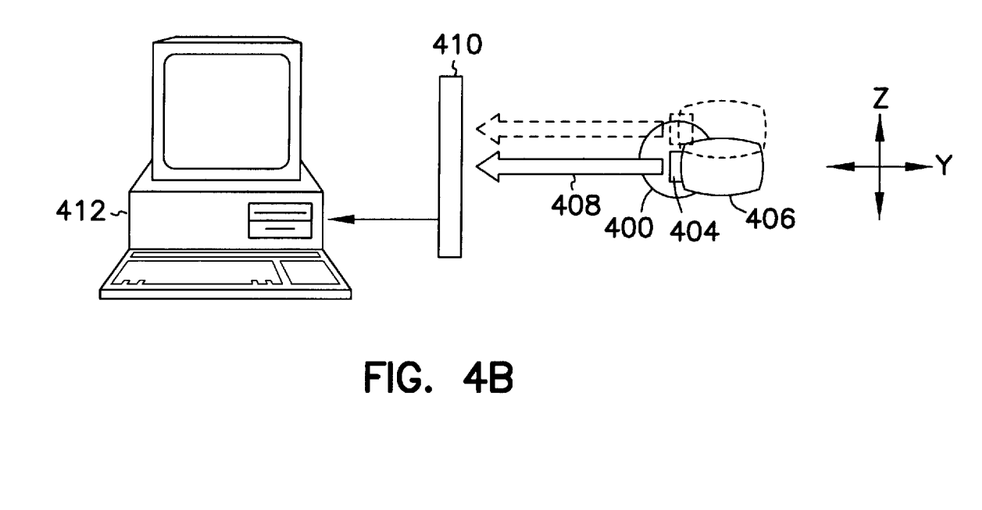

FIGS. 4A shows a flow diagram of information from a detector 410 being sent to a computer 412 with a reflector 404 on the objective lens 406. A secondary light source 400 provides light 402 which is reflected off the reflector 404 as reflected light 408 which strikes the detector 410. The objective lens 406 is shown in two positions. FIG. 4B shows a similar arrangement as FIG. 4A, but with objective lens 406 movement being in a different direction.

Figure 5A:
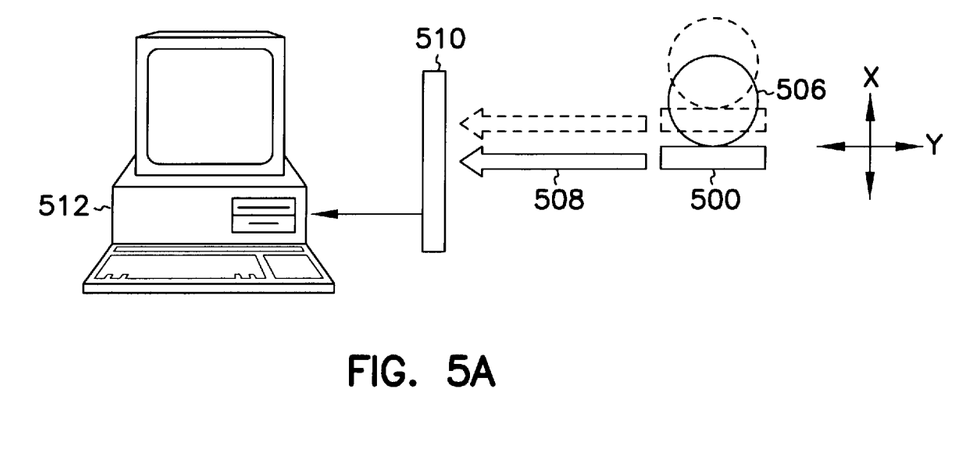
FIGS. 5A and 5B show a flow diagram of information from detectors being sent to a computer with a secondary light source attached to the lens.
Figure 5B:
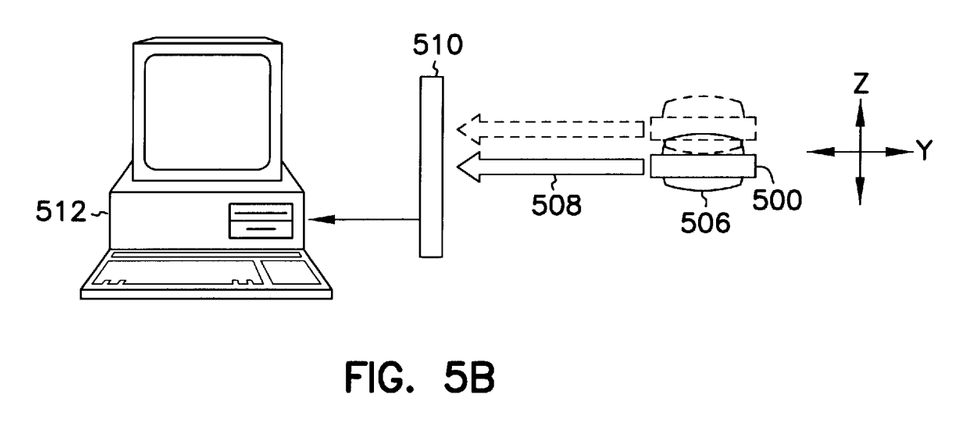

FIGS. 5A and 5B show a flow diagram of information from detectors 510 being sent to a computer 512 with a secondary light source 500 attached to the objective lens 506. As the objective lens 506 and the direct light source 500 move, the light 508 from the direct light source 500 attached to the objective lens 506 also changes its position and where it contacts the detector 510.

EXAMPLE

This example was used to determine the usefulness and accuracy of having a reference signal generated by a relatively thin, (compared to the focus scan amplitude) transparent object, i.e. cover glass window, transparent polymer film, and the like, placed between the sample being scanned and the moving objective. An in-focus signal that corresponds to a reference signal will be generated when the focal point of the laser beam is on either surface of the reference object. Hence, up to two reference signals will be detected before the data signals and then up to two reference signals will be detected after the data signals.

A Sony model KSS-240a CD player optical head (having a quadrilateral detection unit) obtained from a Sony model CDP-311 compact disk player was modified such that motions of the objective lens in the axis of the laser beam, i.e. the focus axis, were driven by a 2 Hz triangle waveform. The amplitude of the waveform caused the objectives amplitude of motion to be 2 millimeters, therefore the depth of field during this particular experiment was also 2 millimeters. A 15 micron thick transparent polymer film was placed between the objective lens and a sample of aluminum foil, such that the surface of the polymer film was perpendicular to the axis of the laser beam. In-focus signals were detected by the quadrilateral detection unit attached to the optical head. These signals were then amplified and acquired then digitally stored in a computer. A plot of the stored data clearly showed the expected two reference signals followed by two data signals followed once again by two reference signals. The reference signals were denoted by their spacing on the plot, which is indicative of the thickness of the plastic film. The data signals also had lower intensity due to lower reflectivity of the plastic film compared to the aluminum foil. To gain a more precise sense of where the in-focus signals were, the first derivative of the data was also plotted. This plot showed the most rapid rate of change in the data to be at the in-focus positions.

During this experiment, the amplitude of the objective lens' motion was lowered to 0.5 millimeters and the plastic film was replaced with a 1 millimeter thick silica window. A dc bias voltage was then applied to the 2 Hz triangle waveform to offset the center of the objectives motion, thereby enabling the focal point to be placed on either side of the window and generating only one in-focus signal. The microscope can utilize this bias voltage to follow a surface of a sample, or to view at a selected depth within a sample.

The confocal microscope of the present invention has been discussed primarily for its use as a purely microscopic tool. It does have direct application in other specific environments, such as mapping surface irregularities in vivos on the eye for use in the ophthalmic industry. The presently designed microscope can have its forward portions of such small dimensions that it can operate within the cavity of the eye fairly easily. Specifically, the confocal microscope of the present invention can provide information about the surface of the eye for use with eye corrective surgeries such as Photorefractive-Keratectomy (PRK) and phototherapeutic keratectomy. PRK is a laser ablative process which reshapes the eye to correct for myopic, hyperopic and astigmatic conditions. Information regarding the curvature of the eye about orthogonal axes provides a guide to how myopic, hyperopic or astigmatic a specific eye is. This information can be used to prescribe a laser treatment that is tailored for a specific patient. Information about other irregularities and features can be used in other corrective procedures.

Another significant potential for this microscope would be to have the scanned data on the shape, curvature and irregularities on the surface of the eye captured in data form, used to generate a mold conforming to the external measurements and shape of the eye, and then having contact lenses molded in that configuration for use on the patient's eyes. For example, the data could be used with a laser to ablate an exactly configured lens from a polymer preform lens, the data obtained from the confocal microscope of the present invention being used to precisely shape the lens according to the precise data obtained from the confocal microscope. The special features already described for the confocal microscope of the invention enables the eye to be scanned in specialized (optimized) ways. The scanning pattern does not have to be in an orthogonal (raster repeated) manner. The focal point, because of the multiple axes controls, can be moved in a circular or spirographic pattern to minimize scan time. Multiple scans by these various methods may be used, the data compared, and a more accurate mapping effected by an averaging of the two or three different methods (e.g., circular, spirographic, raster scanning).

As newer technologies become commercially available, such a blue semiconductive laser diodes, fluorescent microscopy and other assemblies where infrared radiation could be undesirable can be configured.

It is commonly understood in the ophthalmic industry that the use of ablateable masks with the PRK procedure has significant advantages over current beam shaping techniques. An ablateable mask can be used to change the total distribution of energy to which the eye is exposed during the PRK procedure. To reshape the eye (e.g., change the overall curvature of the surface of the eye), various regions of the eye need to be ablated in a precisely defined manner and degree. For example, if the patient is myopic, the radius of curvature of the cornea is too small. To correct this condition with PRK, more material needs to be ablated from the center of the eye than from the surrounding areas. This effectively flattens the eye and increases the radius of curvature of the cornea. A similar procedure is effected with an expanding aperture or iris which exposes the center of the eye to more radiation than the surrounding tissue with a given number of laser pulses. In the present technology using a mask, the mask is differentially ablated or is proportionally thinner as needed for selective ablation of the mask and surface of the eye.

Information data from the present microscope can be used to map the surface of the eye with sufficient exactness as to enable ablative mask design and contact lens design.

Figure 6:
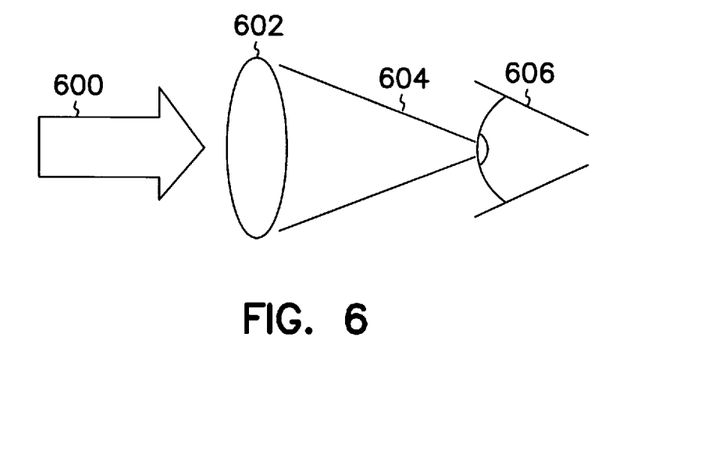
FIG. 6 shows the generation of a 3D contour of an eye.
Figure 7A:
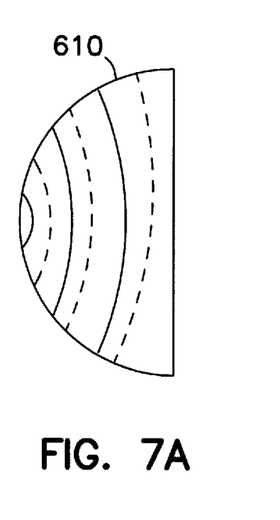
FIGS. 7A and 7B show a representation of a 3D contour map of an eye.
Figure 7B:
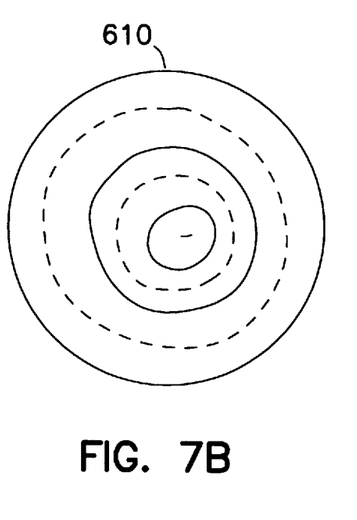

FIG. 6 shows light 600 passing through the objective lens 602 as focussed light 604 which then contacts the surface of the eye 606 to provide data for mapping of the surface of the eye. FIG. 7A shows a side view of a contour map 610 of an eye and FIG. 7B shows a direct on view of a contour map 610 of an eye.

We claim:

1. A confocal microscope comprising:
   an illumination source producing a light beam along a preferred optical axis;
   a low mass objective lens scanned in an oscillating manner in at least one direction by a mechanical drive, said at least one direction being parallel to said optical axis;
   the objective lens focussing the beam to a focal point into a volume of space into which a sample may be placed;
   the optical aperture of said objective lens being at least partially filled by said light beam during at least a portion of said scan;
   a beam splitter that diverts at least a portion of light reflected or emitted from said sample along said optical axis;
   a means for detecting said emitted or reflected light originating proximate to said focal point and diverted by said beam splitter; and
   a computer for recording the signal from said detection means to form a recorded signal and b) for estimating the position of said objective lens;
   wherein said focal point is capable of being moved in at least two dimensions, at least one of said at least two dimensions is parallel to said optical axis, and said microscope has means to reduce how far said focal point moves in said at least one of said at least two dimensions.

2. A confocal microscope comprising:
   an illumination source producing a light beam along a preferred optical axis;
   a low mass objective lens scanned in an oscillating manner in at least one dimension by a mechanical drive;
   the objective lens focusing the beam to a focal point into a volume of space into which a sample may be placed;
   the optical aperture of said objective lens being at least partially filled by said light beam during at least a portion of said scan;
   a beam splitter that diverts at least a portion of the light reflected or emitted from said sample along said optical axis;
   a means for detecting said emitted or reflected light originating proximate to said focal point and diverted by said beam splitter; and
   a computer for a) recording the signal from said detection means to form a recorded signal and b) for estimating the position of said objective lens,
   wherein at least one axis of motion of said objective lens is provided by an electromagnetic coil which is provided with a drive current and interacts with a stationary magnetic field, wherein the motion of said objective lens occurs in an arc.

3. The microscope of claim 2, wherein resonance as measured by mechanical quality factor Q of said mechanical drive is less than 5.

4. The microscope of claim 2, wherein resonance as measured by mechanical quality factor Q of said mechanical drive is less than 2.

5. The microscope of claim 2, wherein said means for detecting said reflected or emitted light comprises a focusing lens focusing said reflected or emitted light onto a pinhole and said pinhole is covering a photodetector.

6. The microscope of claim 2, wherein the oscillation of the objective lens being capable of being adjusted to a smaller amplitude than the maximum amplitude of oscillation of the objective lens.

7. A confocal microscope comprising:
   an illumination source producing a light beam along a preferred optical axis;
   a low mass objective lens scanned in an oscillating manner in at least one dimension by a mechanical drive;
   the objective lens focusing the beam to a focal point into a volume of space into which a sample may be placed;
   the optical aperture of said objective lens being at least partially filled by said light beam during at least a portion of said scan;
   a beam splitter that diverts at least a portion of the light reflected or emitted from said sample along said optical axis;
   a means for detecting said emitted or reflected light originating proximate to said focal point and diverted by said beam splitter; and
   a computer for a) recording the signal from said detection means to form a recorded signal and b) for estimating the position of said objective lens,
   wherein at least one axis of motion of said objective lens is provided by an electromagnetic coil which is provided with a drive current and interacts with a stationary magnetic field, wherein the value of the said recorded signal is dependent on the intensity of said reflected or emitted light, and, wherein the motion of said objective lens occurs in an arc.

8. The microscope of claim 7 wherein said microscope has a depth of field, and the depth of field of said microscope along an axis parallel to the portion of light reflected or emitted from said surface is between 0.1 and 2 mm.

9. A method of improving ophthalmic performance comprising:
   a) providing a confocal microscope comprising
      an illumination source producing a light beam along an optical axis;
      a low mass objective lens scanned in an oscillating manner in at least one dimension by a mechanical drive;
         the objective lens focusing the beam to a focal point into a volume of space into which a sample may be placed;
      the optical aperture of said objective lens being at least partially filled by said light beam during at least a portion of said scan;
      a beam splitter that diverts at least a portion of the light reflected or emitted from said sample along said optical axis;
      a means for detecting said emitted or reflected light originating proximate to said focal point and diverted by said beam splitter;
      and in a computer, using the signal from said detection means and to estimate the position of said objective lens;
   b) directing said focal point of said objective lens at an eye within a patient,
   c) collecting data from signals recorded by said detection means to construct a three dimensional map of an eye, and
   d) using said map to direct a laser in an opthalmic procedure selected from the group consisting of keratectomy, eye mapping and lens manufacture.

10. A method of providing an image comprising:

providing illumination from a source by producing a light beam along an optical axis;

passing said light beam through an objective lens oscillating in at least two dimensions, at least one of said at least two dimensions being parallel to said optical axis by at least one mechanical drive, said objective lens having an optical axis, and one of said at least two dimensions being perpendicular to said optical axis;

diverting a portion of light which is reflected or emitted from a sample along said optical axis with a beam splitter;

detecting said emitted or reflected light diverted by said beam splitter; and while said objective lens is oscillating in at least two dimensions, detecting said reflected or emitted light by detection means and collecting data from signals.

11. The method of claim 10 wherein motion of said objective lens during oscillation is in an arc.

12. The method of claim 10 wherein said objective lens is part of an optical assembly comprising said lens and a mechanical drive and said data comprises data obtained by moving a focal point of said objective lens through an area of at least 0.35 mm squared without moving said optical assembly.

13. The method of claim 12 wherein data is obtained without moving said sample but by moving said objective lens and said optical assembly.

14. The method of claim 10 wherein said objective lens also has a focal point, and said oscillation in at least two dimensions moves said focal point through a surface of said sample, generating only one in-focus signal.

15. The method of claim 10 wherein said objective lens also has a focal point, and said oscillation in at least two dimensions moves said focal point through a surface of said sample and into said sample generating an in-focus signal on more than one surface of said sample.

16. The method of claim 10 wherein said objective lens is part of an optical assembly comprising said lens and mechanical drive, said objective lens is moved in two or three axes, and said optical assembly is moved in at least one axis.

17. The method of claim 10 wherein said objective lens also has a focal point, and said oscillation in at least two dimensions moves said focal point along at least one axis other than an axis parallel to an optical axis of said objective lens, oscillating said objective lens parallel to said optical axis, causing movement of the focal point within maximum boundaries parallel to said optical axis at an amplitude of oscillation which is less than the maximum boundaries of movement of said focal point.

18. The method of claim 17 wherein said oscillating parallel to said optical axis is performed at a frequency greater than the frequency of oscillation parallel to the optical axis when scanning at the boundaries of movement of said focal point.

19. The method of claim 18 wherein said frequency of oscillation of said objective lens has maximum boundaries, said oscillating being done at less than maximum boundaries of said oscillation.

20. The method of claim 10 wherein said oscillating said objective lens in two dimensions moves said objective lens in an arc and said arc passes through said optical axis in an orthogonal path.

21. A confocal microscope comprising:

an illumination source producing a light beam along an optical axis;

an objective lens scanned in an oscillating manner in at least two dimensions by a mechanical drive, at least one of said at least two dimensions being parallel to said optical axis;

the objective lens focusing the beam to a focal point into a volume of space into which a sample may be placed;

the optical aperture of said objective lens being at least partially filled by said light beam during at least a portion of said scan;

a beam splitter that diverts at least a portion of light reflected or emitted from said sample along said optical axis;

a means for detecting said reflected or emitted light originating proximate to said focal point and diverted by said beam splitter; and a means for estimating the position of said objective lens.

22. The confocal microscope of claim 21 wherein said focal point is capable of being moved in at least one dimension which has maximum limits within which said focal point may be moved by oscillation of said objective lens at an amplitude, said microscope having means to vary said amplitude within said maximum limits.

23. The confocal microscope of claim 21 wherein said focal point is capable of being moved in at least one dimension which has maximum limits within which said focal point may be moved by oscillation of said objective lens at a frequency, and said frequency of oscillation can be varied.

24. A method of providing an image comprising:

providing illumination from a source by producing a light beam along an optical axis;

passing said light beam through a low mass objective lens oscillating in at least two dimensions by at least one mechanical drive, one of said at least two dimensions being parallel to said optical axis, said objective lens having an optical axis, and one of said at least two dimensions being perpendicular to said optical axis;

diverting a portion of light which is reflected or emitted from a sample along said optical axis with a beam splitter;

detecting said emitted or reflected light diverted by said beam splitter; and while said objective lens is scanned in an oscillating manner in at least two dimensions, detecting said reflected or emitted light by detection means and collecting data from signals, wherein said objective lens also has a focal point, and said oscillation in at least two dimensions moves said focal point along at least one axis other than an axis parallel to an optical axis of said objective lens, oscillating said objective lens parallel to said optical axis, causing movement of the focal point within maximum boundaries parallel to said optical axis at an amplitude of oscillation which is less than the maximum boundaries of movement of said focal point, said movement of said focal point being approximately centered on a surface of a sample.

25. The confocal microscope of claim 21 wherein said means for detecting said reflected or emitted light comprises a focusing lens focusing said reflected or emitted light onto a pinhole and said pinhole is covering a photodetector.

26. The confocal microscope of claim 21 wherein said objective lens is capable of moving during said oscillation in an arc.

27. The confocal microscope of claim 21 wherein estimating the position of said objective lens from a signal from detecting said reflected or emitted light said signal is performed by determining said position based upon a source of drive current and a timing means.

28. The confocal microscope of claim 21, wherein at least one axis of motion of said objective lens is provided by an electromagnetic coil which is provided with a drive current and interacts with a stationary magnetic field.

29. The confocal microscope of claim 21 wherein data may be obtained without moving said sample but by moving said objective lens.

30. The method of claim 10 wherein said objective lens is part of an optical assembly comprising said lens and a mechanical drive and said data comprises data obtained by moving a focal point of said objective lens through an area without moving said optical assembly.

31. A confocal microscope comprising:

an illumination source producing a light beam along an optical axis;

an objective lens scanned in an oscillating manner in at least two dimensions by a mechanical drive, at least one of said at least two dimensions being parallel to said optical axis;

the objective lens focusing the beam to a focal point into a volume of space into which a sample may be placed;

the optical aperture of said objective lens being at least partially filled by said light beam during at least a portion of said scan;

a beam splitter that diverts at least a portion of light reflected or emitted from said sample along said optical axis;

a means for detecting said reflected or emitted light originating proximate to said focal point and diverted by said beam splitter; and a means for estimating the position of said objective lens;

wherein estimating the position of said objective lens is performed by determining said position based upon a source of drive current and a timing means.

32. The method of claim 24 wherein as said objective lens moves over said surface of said sample, said movement of said focal point is maintained approximately centered on said surface of said sample.

* * * * *